United States Patent
Pang et al.

(10) Patent No.: US 11,337,236 B2
(45) Date of Patent: May 17, 2022

(54) TIME-SLOTTED SCHEDULING OF PACKETS IN AN INDUSTRIAL WIRELESS NETWORK

(71) Applicant: Hitachi Energy Switzerland AG, Baden (CH)

(72) Inventors: Zhibo Pang, Västerås (SE); Michele Luvisotto, Västerås (SE); Xiaolin Jiang, Stockholm (SE); Roger Jansson, Västerås (SE); Carlo Fischione, Stockholm (SE)

(73) Assignee: Hitachi Energy Switzerland AG, Baden (CH)

( * ) Notice: Subject to any disclaimer, the term of this patent is extended or adjusted under 35 U.S.C. 154(b) by 212 days.

(21) Appl. No.: 16/777,478

(22) Filed: Jan. 30, 2020

(65) Prior Publication Data

US 2020/0252952 A1 Aug. 6, 2020

(30) Foreign Application Priority Data

Feb. 6, 2019 (EP) .................................... 19155673

(51) Int. Cl.
*H04W 72/12* (2009.01)
*H04W 72/04* (2009.01)
(Continued)

(52) U.S. Cl.
CPC ... *H04W 72/1263* (2013.01); *H04W 72/0446* (2013.01); *H04W 80/02* (2013.01); *H04W 88/08* (2013.01); *H04W 88/12* (2013.01)

(58) Field of Classification Search
CPC ......... H04W 72/1263; H04W 72/0446; H04W 80/02; H04W 88/08; H04W 88/12;
(Continued)

(56) References Cited

U.S. PATENT DOCUMENTS 7,362,734 B1 4/2008 Samaras et al.
8,571,003 B2 * 10/2013 Guo ..................... H04B 7/2656
370/347

(Continued)

FOREIGN PATENT DOCUMENTS

CN 103686801 A 3/2014
DE 60117539 T2 12/2006

OTHER PUBLICATIONS

Extended European Search Report Application No. 19155673.7 Completed: Jun. 28, 2019; dated Jul. 8, 2019 12 Pages.
(Continued)

*Primary Examiner* — Hassan Kizou
*Assistant Examiner* — Abdullahi Ahmed
(74) *Attorney, Agent, or Firm* — Slater Matsil, LLP (57) ABSTRACT

A method for time-slotted scheduling of packets in timeslots between N nodes and K>1 access points in an industrial wireless network, performed by a network controller of the industrial wireless network. The method includes determining the time-slotted scheduling by allocating each timeslot to a respective one of the nodes, wherein each timeslot for each node is divided in K sub-slots, one for each access point, such that in sub-slot k of each timeslot, where $1 \leq k \leq K$, transmission or reception of a packet is made between access point k and the node to which that timeslot is allocated. The method includes providing information to the access points about the determined time-slotted scheduling.

20 Claims, 6 Drawing Sheets

(51) Int. Cl.
*H04W 80/02* (2009.01)
*H04W 88/08* (2009.01)
*H04W 88/12* (2009.01)

(58) Field of Classification Search
CPC . H04W 74/04; H04W 72/02; H04W 72/1278; H04W 84/18; H04W 72/1289; H04W 72/042
See application file for complete search history.

(56) References Cited

U.S. PATENT DOCUMENTS

| 10,536,861 | B2* | 1/2020 | Doherty | H04W 24/04 |
|---|---|---|---|---|
| 11,012,996 | B2* | 5/2021 | Karaki | H04L 5/0082 |
| 2010/0034159 | A1 | 2/2010 | Shin et al. | |
| 2013/0094481 | A1* | 4/2013 | Jeong | H04L 23/02 370/336 |
| 2018/0124812 | A1 | 5/2018 | Thubert et al. | |
| 2018/0242312 | A1* | 8/2018 | Gandhi | H04W 72/0446 |
| 2019/0159201 | A1* | 5/2019 | Jin | H04L 5/0032 |
| 2019/0208463 | A1* | 7/2019 | Lou | H04W 48/12 |
| 2019/0253136 | A1* | 8/2019 | Makki | H04W 88/10 |
| 2019/0320451 | A1* | 10/2019 | Hansen | H04W 72/0446 |
| 2019/0349986 | A1* | 11/2019 | Aijaz | H04W 28/04 |
| 2020/0036483 | A1* | 1/2020 | Aijaz | H04W 72/121 |

OTHER PUBLICATIONS

Quieroz et al.: "Evaluation of Channels Blacklists in TSCH Networks with Star and Tree Topologies", QOS and Security for Wireless and Mobile Networks, ACM, 2 Penn Plaza, Suite 701, New York, NY, Wireless Sensors Networks, published Oct. 28, 2018, Montreal, Canada, pp. 116-123.

Quieroz, D.V. et al.: "Survey and Systematic Mapping of Industrial Wireless Sensor Networks", Journal of Network and Computer Applications, vol. 97, published Sep. 6, 2017, pp. 96-125, XP085205822, ISSN: 1084-8045.

* cited by examiner

TIME-SLOTTED SCHEDULING OF PACKETS IN AN INDUSTRIAL WIRELESS NETWORK

TECHNICAL FIELD

Embodiments presented herein relate to methods, a network controller, an access point, computer programs, and a computer program product for time-slotted scheduling of packets in timeslots between nodes and access points in an industrial wireless network.

BACKGROUND

Wireless communication networks deployed in industrial control applications (e.g. substation automation in the power grid) and hereinafter denoted industrial wireless networks enable equipment control and monitoring. High availability, high reliability, and low latency and determinism are the most important requirements to guarantee smooth operations.

Industrial wireless networks can be used for power grid control (e.g. substation automation) to enable equipment control and monitoring. These networks have hence to accommodate different types of traffic, coming from informational technology (IT) infrastructure (e.g. remote monitoring, metering, etc.) as well as from operational technology (OT) infrastructure (e.g. control systems). Different traffic flows have specific requirements in terms of determinism, latency and reliability, which should be taken into account when the protocol stack and, in particular, the medium access control (MAC) layer in the protocol stack, is designed.

In this regard, the IEEE time-sensitive networking (TSN) working group is developing new standards that allow precise scheduling of heterogeneous traffic flows at the MAC layer of Ethernet networks. Thanks to the usage of time-aware shaper and preemption mechanisms, TSN is able to guarantee to each traffic flow a bounded worst-case latency as well as to implement redundancy and fault tolerance.

To achieve high availability, important functional devices usually have backups. In wireless communication networks, an access point (AP) is responsible to collect messages from nodes (representing sensors, actuators, relays, or the like) via wireless links and forward the messages to the network manager using a wired link (e.g. Ethernet) in the uplink (UL), while it works reversely in the downlink (DL). When there is only one AP, or multiple APs but each taking care of a disjoint set of nodes, the system may fail when communication between the AP and its served nodes fails or is disrupted. As an example, in industrial environments, which are rich of obstacles, the wireless links between nodes and the AP may become temporarily blocked, preventing successful communication. Additionally, as wireless communication is subjected to fading and collision, which degrade reliability, redundancy is needed also to guarantee the reliability requirement. A still further cause of failure, in addition to communication failure between the AP and nodes due to e.g. obstacles, is represented by hardware and/or software failures in the AP itself, which in turn can reduce the availability.

Having backup modules in the same AP device can only guarantee availability, but cannot improve reliability. With very short latency requirement, when wireless links are blocked or experience deep fading, retransmissions are not effective to improve the reliability as there is a small probability for the link to recover within a short time interval.

Hence, there is still a need for an improved communication between nodes and access points in an industrial wireless network.

SUMMARY

An object of embodiments herein is to provide efficient scheduling of packets between the nodes and the access points, enabling improved communication between nodes and access points in the industrial wireless network.

According to a first aspect there is presented a method for time-slotted scheduling of packets in timeslots between N nodes and K>1 access points in an industrial wireless network. The method is performed by a network controller of the industrial wireless network. The method comprises determining the time-slotted scheduling by allocating each timeslot to a respective one of the nodes, wherein each timeslot for each node is divided in K sub-slots, one for each access point, such that in sub-slot k of each timeslot, where $1 \leq k \leq K$, transmission or reception of a packet is made between access point k and the node to which that timeslot is allocated. The method comprises providing information to the access points about the determined time-slotted scheduling.

According to a second aspect there is presented a network controller for time-slotted scheduling of packets in timeslots between N nodes and K>1 access points in an industrial wireless network. The network controller comprises processing circuitry. The processing circuitry is configured to cause the network controller to determine the time-slotted scheduling by allocating each timeslot to a respective one of the nodes, wherein each timeslot for each node is divided in K sub-slots, one for each access point, such that in sub-slot k of each timeslot, where $1 \leq k \leq K$, transmission or reception of a packet is made between access point k and the node to which that timeslot is allocated. The processing circuitry is configured to cause the network controller to provide information to the access points about the determined time-slotted scheduling.

According to a third aspect there is presented a network controller for time-slotted scheduling of packets in timeslots between N nodes and K>1 access points in an industrial wireless network. The network controller comprises a determine module configured to determine the time-slotted scheduling by allocating each timeslot to a respective one of the nodes, wherein each timeslot for each node is divided in K sub-slots, one for each access point, such that in sub-slot k of each timeslot, where $1 \leq k \leq K$, transmission or reception of a packet is made between access point k and the node to which that timeslot is allocated. The network controller comprises a provide module configured to provide information to the access points about the determined time-slotted scheduling.

According to a fourth aspect there is presented a computer program for time-slotted scheduling of packets in timeslots between N nodes and K>1 access points in an industrial wireless network, the computer program comprising computer program code which, when run on processing circuitry of a network controller, causes the network controller to perform a method according to the first aspect.

According to a fifth aspect there is presented a method for time-slotted scheduling of packets in timeslots between nodes and an access point in an industrial wireless network. The method is performed by the access point. The method comprises obtaining information about determined time-slotted scheduling from a network controller of the industrial wireless network, wherein according to the information, each timeslot is allocated to a respective one of the nodes, wherein each timeslot for each node is divided in K sub-slots, one of which being for the access point, such that in one single of the sub-slot of each timeslot, transmission or reception of a packet is made between the access point and the node to which that timeslot is allocated. The method comprises communicating packets with the nodes according to the determined time-slotted scheduling.

According to a sixth aspect there is presented an access point for time-slotted scheduling of packets in timeslots between nodes and an access point in an industrial wireless network. The access point comprises processing circuitry. The processing circuitry is configured to cause the access point to obtain information about determined time-slotted scheduling from a network controller of the industrial wireless network, wherein according to the information, each timeslot is allocated to a respective one of the nodes, wherein each timeslot for each node is divided in K sub-slots, one of which being for the access point, such that in one single of the sub-slot of each timeslot, transmission or reception of a packet is made between the access point and the node to which that timeslot is allocated. The processing circuitry is configured to cause the access point to communicate packets with the nodes according to the determined time-slotted scheduling.

According to a seventh aspect there is presented an access point for time-slotted scheduling of packets in timeslots between nodes and an access point in an industrial wireless network. The access point comprises an obtain module configured to obtain information about determined time-slotted scheduling from a network controller of the industrial wireless network, wherein according to the information, each timeslot is allocated to a respective one of the nodes, wherein each timeslot for each node is divided in K sub-slots, one of which being for the access point, such that in one single of the sub-slot of each timeslot, transmission or reception of a packet is made between the access point and the node to which that timeslot is allocated. The access point comprises a communicate module configured to communicate packets with the nodes according to the determined time-slotted scheduling.

According to an eighth aspect there is presented a computer program for time-slotted scheduling of packets in timeslots between nodes and an access point in an industrial wireless network, the computer program comprising computer program code which, when run on processing circuitry of the access point, causes the access point to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network controllers, these access points, and these computer programs, and this computer program product provide efficient scheduling of packets between the nodes and the access points.

Advantageously these methods, these network controllers, these access points, and these computer programs, and this computer program product improve the communication between the nodes and the access points in the industrial wireless network.

Advantageously these methods, these network controllers, these access points, and these computer programs, and this computer program product improve both the availability and reliability of the communication between the nodes and the access points in the industrial wireless network.

Advantageously, the complexity of the proposed time-slotted scheduling is low as the network controller only needs to determine the scheduling for one access point, and then time-shifting the determined time-slotted scheduling for the remaining access points.

Advantageously, the thus time-shifted time-slotted scheduling enables each node to, within one timeslot, receive multiple copies of one packet from more than one access point. Advantageously, this might guarantee determinism while satisfying reliability requirements.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
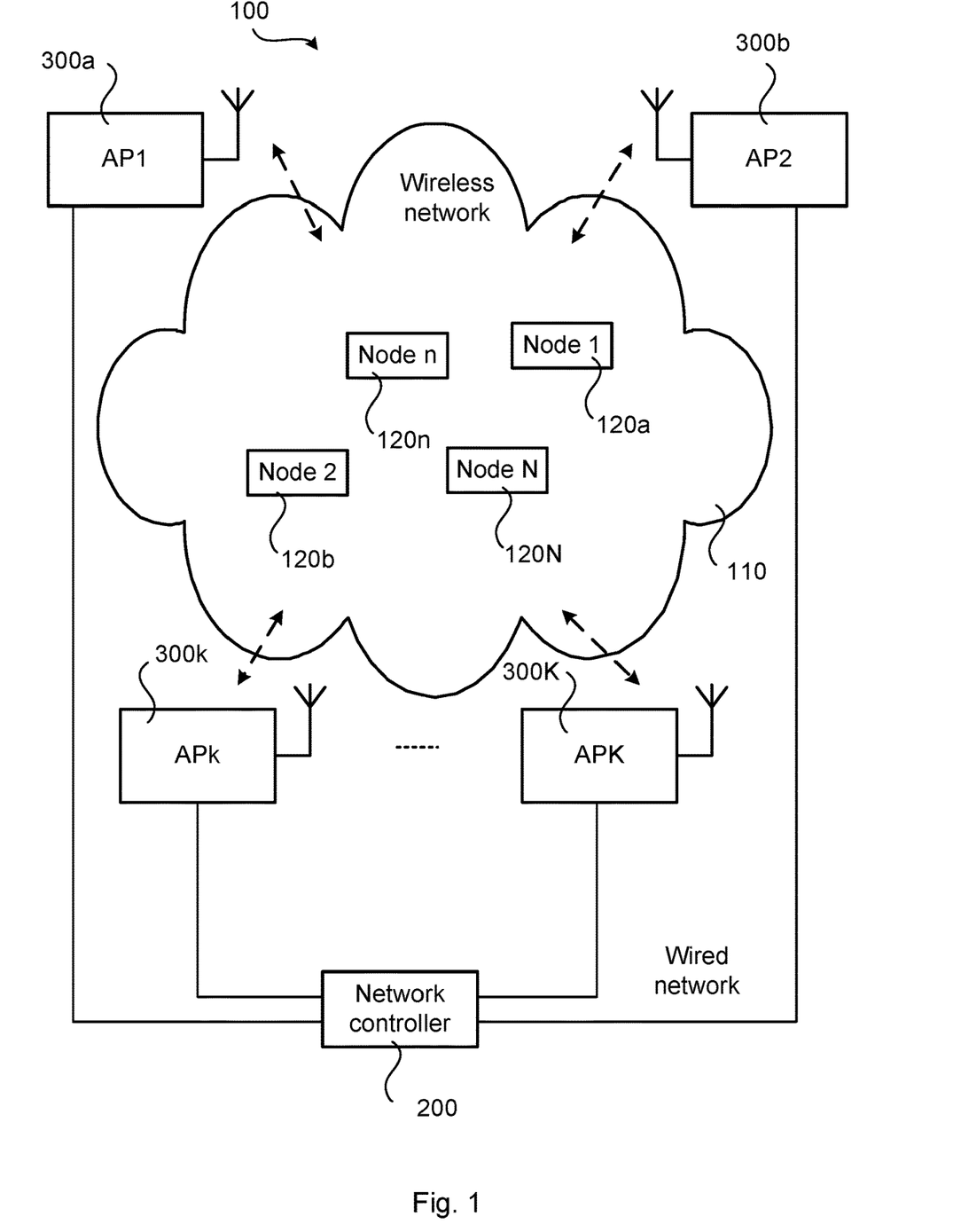
FIG. 1 is a schematic diagram illustrating an industrial communication network according to embodiments.

FIG. 1 is a schematic diagram illustrating an industrial communication network 100 where embodiments presented herein can be applied. The industrial communication network 100 in turn comprises an industrial wireless network 110. K access points 300a, 300b, ..., 300k, ..., 300K provide wireless network access to N nodes 120a, 120b, ..., 120n, ..., 120N located in a coverage area of the industrial wireless network 110. Non-limiting examples of the nodes 120a:120N are sensors, actuators, and/or relays. In general terms, the communication between the access points 300a:300K and the nodes 120a:120N is packet based. Further, the access points 300a:300K and the nodes 120a:120N communicate according to a time-slotted scheduling. According to one non-limiting example the time-slotted scheduling is compatible with TSN and with the time-slotted superframe structure of IEEE 802.15.4e.

The access points 300a:300K are responsible for collecting packets (typically containing data, such as measurements, or status values) from the nodes 120a:120N via wireless links and forward the packets to a network controller 200 using a wired connection (e.g. Ethernet) in the uplink (UL). In the downlink (DL) the APs forwards packets (typically containing actuation commands) from the network controller 200 to the nodes 120a:120N. The network controller 200 is thereby enabled to, via the access points 300a:300K, obtain measurements or other type of data, as collected by the nodes 120a:120N and to provide control signals, such as actuation commands, instructions for the nodes 120a:120N to collect measurements, etc., or other types of commands, to the nodes 120a:120N and the access points 300a:300K. Operation, such as the time-slotted scheduling, of the access points 300a:300K is controlled by the network controller 200.

The access points 300a:300K might be deployed at mutually different geographical locations in order to improve the system availability. Further, the access points 300a:300K are, by the network controller 200, configured to communicate with all the nodes 120a:120N according to a specific time-slotted scheduling as will be further disclosed below.

Deploying multiple access points 300a:300K at different geographical locations, where each access point 300a:300K is active and communicates with all the nodes 120a:120N might achieve better availability and reliability performance than merely having a functional backup in the same access point 300a:300K that only turns active when the primary functional module in the access point 300a:300K breaks down.

The embodiments disclosed herein thus relate to mechanisms for time-slotted scheduling of packets in timeslots between N nodes 120a:120N and K>1 access points 300a:300K in an industrial wireless network 110. In order to obtain such mechanisms there is provided a network controller 200, a method performed by the network controller 200, a computer program product comprising code, for example in the form of a computer program, that when run on processing circuitry of the network controller 200, causes the network controller 200 to perform the method. In order to obtain such mechanisms there is further provided an access point 300a, a method performed by the access point 300a, and a computer program product comprising code, for example in the form of a computer program, that when run on processing circuitry of the access point 300a, causes the access point 300a to perform the method.

Figure 2:
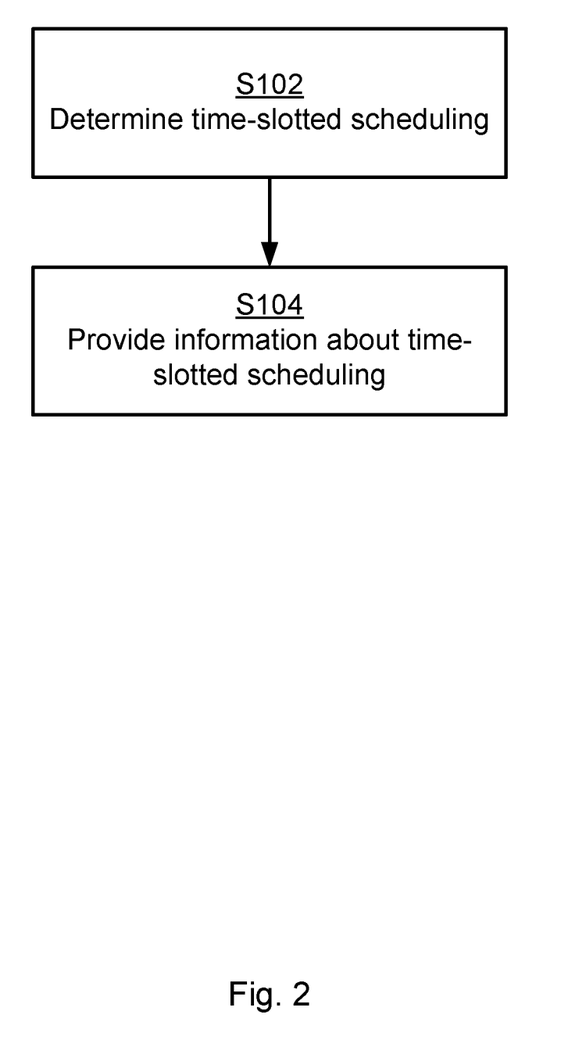
FIGS. 2 and 5 are flowcharts of methods according to embodiments.

Reference is now made to FIG. 2 illustrating a method for time-slotted scheduling of packets in timeslots between N nodes 120a:120N and K>1 access points 300a:300K in an industrial wireless network 110 as performed by the network controller 200 according to an embodiment.

As noted above, the network controller 200 is responsible for determining the transmission and reception scheduling of packets to and from the nodes 120a:120N, processing the received data and generating corresponding control signaling. Particularly, the network controller 200 is configured to perform step S102.

S102: The network controller 200 determines the time-slotted scheduling by allocating each timeslot 540a:540M to a respective one of the nodes 120a:120N. Each timeslot 540a:540M for each node 120a:120N is divided in K sub-slots 550a:550K, one for each access point 300a:300K. Each timeslot 540a:540M is divided such that in sub-slot k of each timeslot, where $1 \leq k \leq K$, transmission or reception of a packet is made between access point k and the node to which that timeslot is allocated.

Considering the industrial wireless network 110, the network controller 200 only needs to determine the scheduling between the nodes 120a:120N and one of the access point 300a:300K. The scheduling for the remaining K−1 access points are obtained by time-shifting the first determined scheduling on a sub-slot basis within each subframe. The scheduling is transparent in the sense that the network controller 200 does not need to distinguish between the access points 300a:300K or schedule the traffic for each access point 300a:300K separately.

The access points 300a:300K are then configured with the time-slotted scheduling by the network controller 200 informing the access points 300a:300K about the determined time-slotted scheduling. Particularly, the network controller 200 is configured to perform step S104.

S104: The network controller 200 provides information to the access points 300a:300K about the determined time-slotted scheduling.

Each access point 300a:300K then communicates (by transmitting and receiving packets) with the nodes 120a:120N according to its own time-slotted scheduling, and thus the system does not fail if one access point 300a:300K breaks down or its transmission and/or reception is shielded from one or more of the nodes 120a:120N.

Embodiments relating to further details of time-slotted scheduling of packets in timeslots between N nodes 120a:120N and K>1 access points 300a:300K in an industrial wireless network 110 as performed by the network controller 200 will now be disclosed.

According to an embodiment the time-slotted scheduling is performed at the MAC protocol layer. In some aspects, a MAC layer time-slotted scheduling is therefore proposed based on a duplicated network topology. Accordingly, each access point 300a:300K communicates with all the nodes 120a:120N with exactly the same schedule in a time-shifted way. For K access point 300a:300K each timeslot is hence divided into K sub-slots, one for each of the K access points 300a:300K. From the perspective of the network controller 200, there is then only a need to determine the schedule for one access points and then time-wise split the resources of the timeslot for each node 120a:120N between the K access points 300a:300K.

According to an embodiment, the access points 300a:300K are configured to serve a common set of the nodes 120a:120N.

The proposed time-slotted scheduling is thus different from time-slotted scheduling according to which multiple access points 300a:300K are responsible for disjoint sets of the nodes 120a:120N, where the communication between the access points 300a:300K and the nodes 120a:120N needs to be scheduled separately for each access point 300a:300K.

Figure 3:
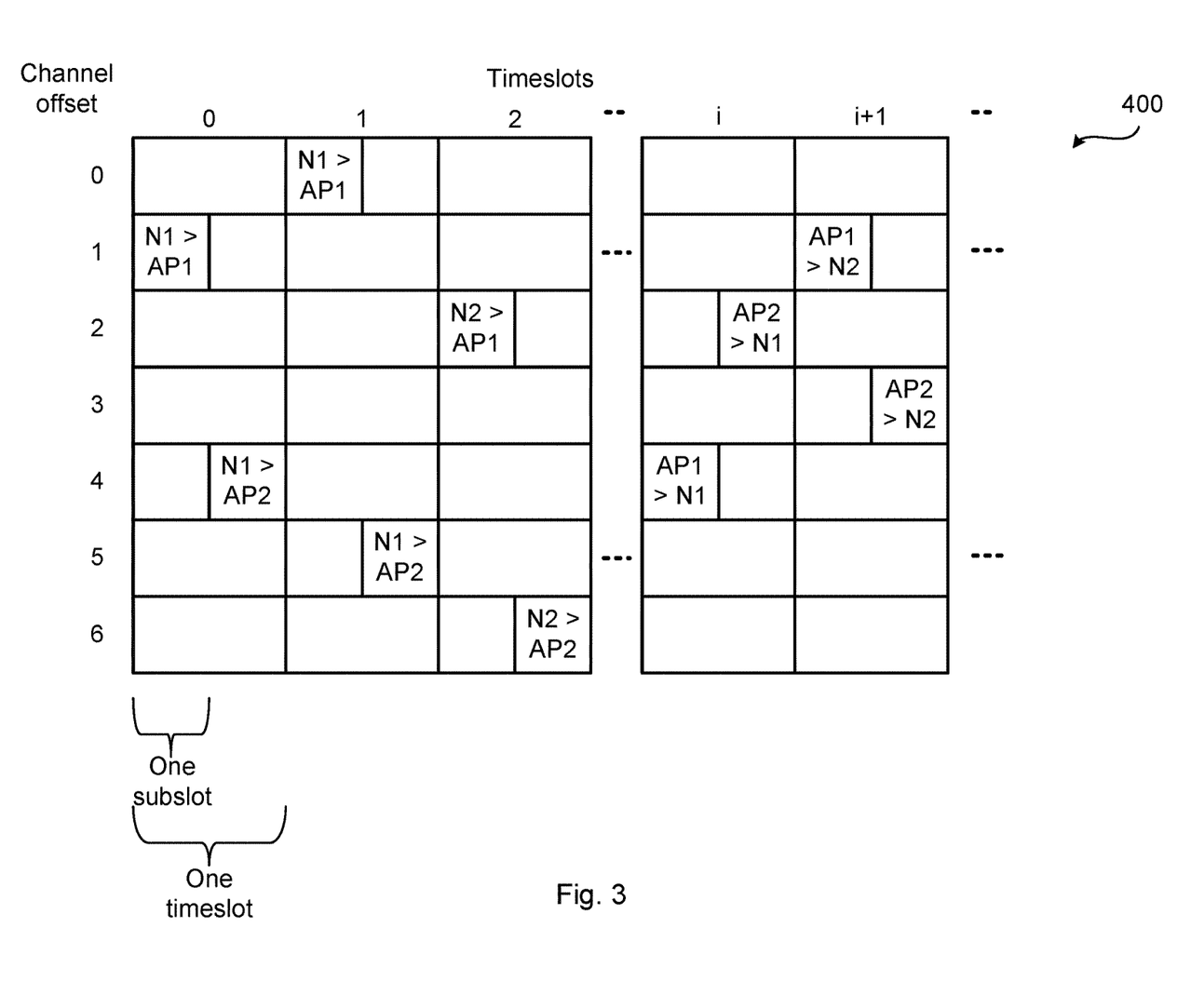
FIG. 3 is a schematic illustration of time-slotted scheduling of packets in timeslots according to an embodiment.

According to an embodiment, respective duplicated messages are communicated within each timeslot 540a:540M such that in timeslot n, one and the same message is communicated between all the K access points 300a:300K and node n. Multiple copies of one and the same messages are thereby sent to the network controller 200 and the nodes 120a:120N, possibly with different signal qualities, from the access points 300a:300K, and the network controller 200 can select the best one (or combine two or more messages), which increases the reliability. Multiple copies of one and the same messages are in the same way sent to the nodes 120a:120N, enabling the nodes 120a:120N to select the message received with best signal quality (or combine two or more messages), which again increases the reliability An example of the proposed time-slotted scheduling for two access points (AP1 and AP2) and two nodes (N1 and N2) is shown in FIG. 3. FIG. 3 illustrates a time/frequency grid 400 according to which resource units are divided in both time and frequency domains (as represented by timeslots and channel offsets, respectively) and allocated to timeslots for the nodes 120a:120N. Each timeslot is divided into two sub-slots (one for each of the two access points), and the nodes N1, N2 communicate with AP1 using the first sub-slots and with AP2 using the second sub-slots in each timeslot.

In FIG. 3, one of the nodes is thus transmitting, or receiving in each timeslot. Hence, each access point is only transmitting to, or receiving from, one of the nodes per timeslot. In FIG. 3 the notation Nx>APy denotes that node x (where x∈{1, 2, ..., N}), is transmitting a packet to access point y (where y∈{1, 2, ..., K}), and hence that access point y receives the packet from node x. Similarly, the notation APy>Nx denotes that access point y is transmitting a packet to node n, and hence that node x receives the packet from access point y. The skilled person understands how the above principles of FIG. 3 can be generalized to more than two access points 300a:300K.

In some aspects, as in the example of FIG. 3, the timeslot for one and the same nodes 120a:120N are spread out in time. Particularly, according to an embodiment, the timeslots 540a:540M are allocated such that adjacent timeslot are allocated to respective different ones of the nodes 120a:120N. This could improve the probability of the communication between the access points 300a:300K and the nodes 120a:120N being successful in time-dependent fading radio propagation channels.

In some aspects, as in the example of FIG. 3, the sub-slots within each timeslot are frequency offset relative each other among the access points 300a:300K. Particularly, according to an embodiment, the sub-slots 550a:550K within each timeslot 540a:540M are frequency offset relative each other such that each of the K access points 300a:300K communicates with the nodes 120a:120N in its own frequency channel during each timeslot 540a:540M. This could improve the probability of the communication between the access points 300a:300K and the nodes 120a:120N being successful in frequency-dependent fading radio propagation channels. The frequency offset of the sub-slots 550a:550K might vary between the timeslots 540a:540K.

By the end of each timeslot 540a:540M, the network controller 200 might receive duplicated copies of the same message, as received in packets by the access points 300a: 300K from the nodes 120a:120N. The network controller 200 might then select the message with the strongest signal quality. Further, by comparing, for example, the signal quality of the packets in each timeslot 540a:540M to each other, the network controller 200 might determine to keep the same time-slotted scheduling for the next superframe, or to determine a new time-slotted scheduling for the next superframe. Information about whether the time-slotted scheduling is to be kept or whether it is to be changed might be provided in the beacon 510 towards the access points 300a:300K. In some aspects there are a set of pre-determined time-slotted schedulings that the network controller 200 might select from when determining which time-slotted scheduling to use for a particular superframe. The information to the access points 300a:300K about the determined time-slotted scheduling might then be provided as a bitmap, where a bit set to binary 1 indicates which one of the pre-determined time-slotted schedulings that is to be used next.

Similarly, each node 120a:120N might also receive duplicated copies of packets with command messages from the network controller 200 via the access points 300a:300K. For example, at the end of timeslot n, node n might receive K copies of a command message, one from each of the K access points 300a:300K, and can select the command message having been received with the best quality. In this way, the reliability is increased. Moreover, as the duplicated copies are received in one timeslot, lower latency and better determinism can be achieved compared to that achieved by retransmission or individual scheduling where the copies are scheduled at different timeslots.

Figure 4:
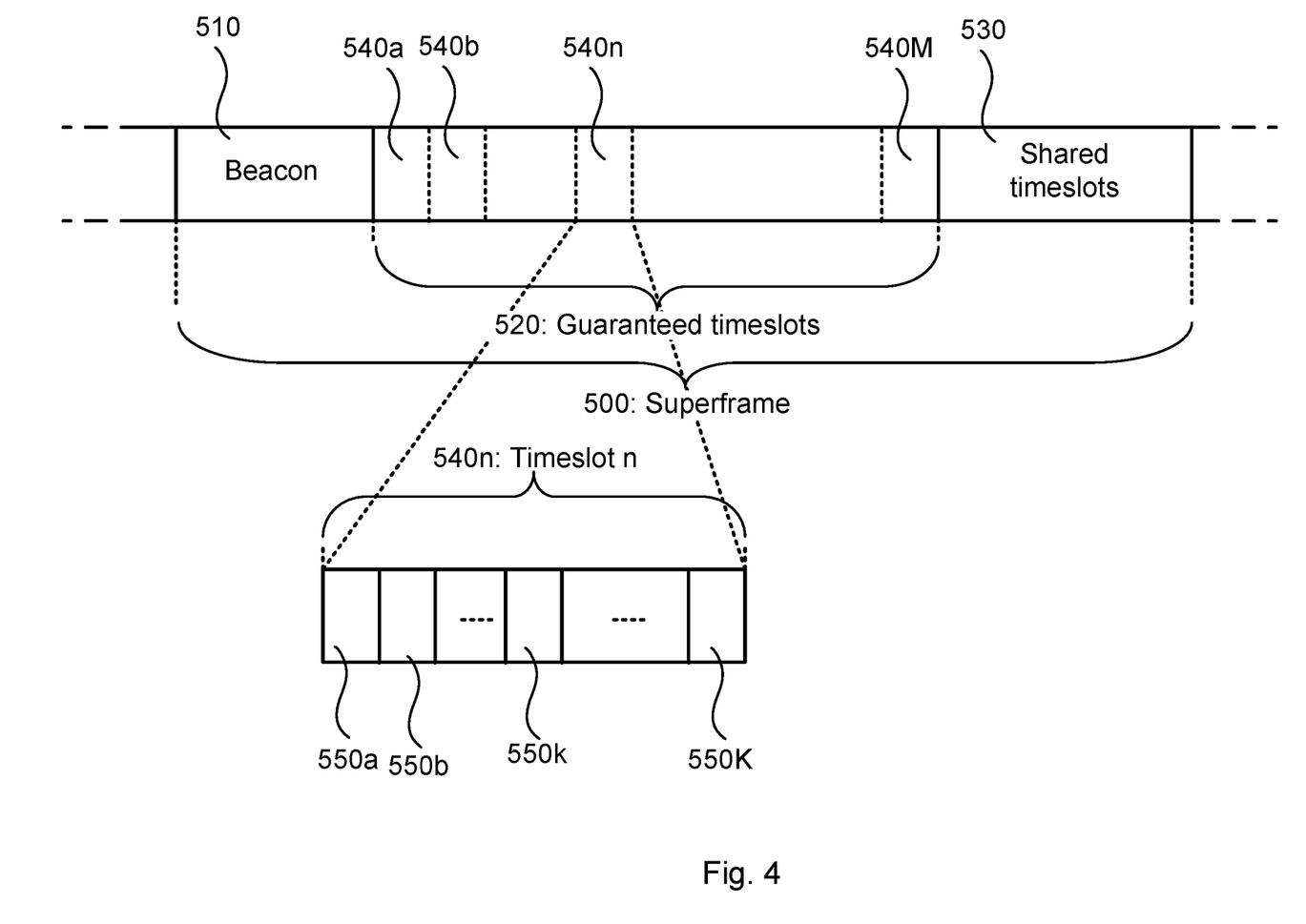
FIG. 4 is a schematic illustration of a superframe according to an embodiment.

As noted above, in some aspects the time-slotted scheduling is compatible with TSN with the time-slotted superframe structure of IEEE 802.15.4e. Reference is now made to FIG. 4 schematically illustrating the structure of a superframe 500 in which a guaranteed timeslots 520 is provided. A beacon signal 510 could indicate the beginning of the superframe 500. The nodes 120a:120N are, by means of the guaranteed timeslots 520, guaranteed at least two of the timeslots 540a, 540b, ..., 540n, ..., 540M in the superframe 500; one for downlink and one for uplink, and hence M≥2N. One or more of the nodes 120a:120N might, additionally, be allocated timeslots among one or more shared timeslots 530. According to an embodiment the timeslots 540a:540M are grouped into sets of guaranteed timeslots 520. Each node 120a:120N is then allocated at least two timeslots 540a:540M within each set of guaranteed timeslots 520; one for reception of a packet from the K access points 300a:300K, and one for transmission of a packet to the K access points 300a:300K.

As in the illustrative example of FIG. 4, in some aspects one occurrence of the beacon signal 510, one occurrence of a set of guaranteed timeslots 520 and one occurrence of a set of shared timeslots 530 define one superframe 500. Particularly, according to an embodiment each set of guaranteed timeslots 520 is part of a superframe 500.

Figure 5:
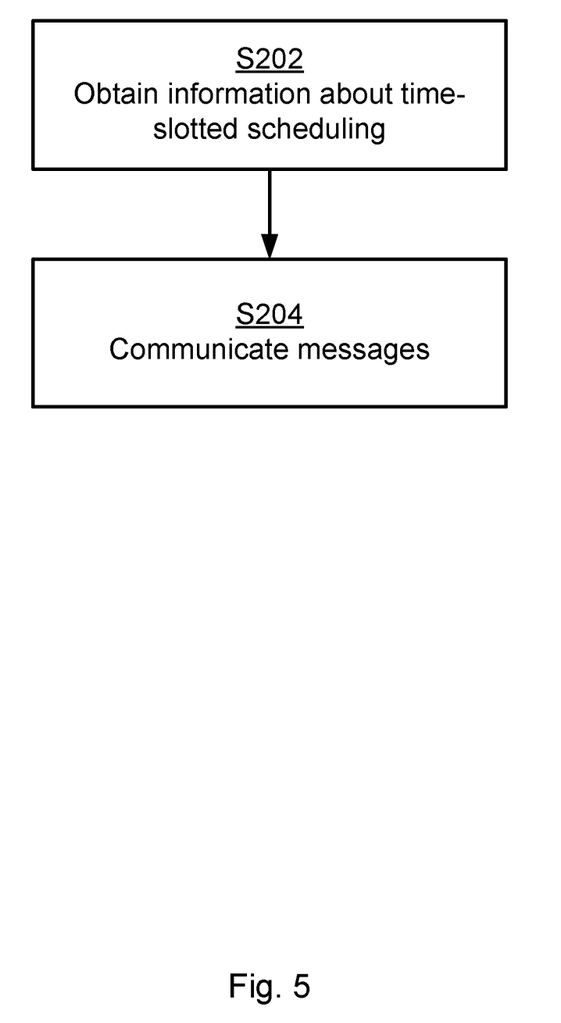

Reference is now made to FIG. 5 illustrating a method for time-slotted scheduling of packets in timeslots between nodes 120a:120N and an access point 300a in an industrial wireless network 110 as performed by the access point 300a according to an embodiment.

As disclosed above, the access points 300a:300K are configured with the time-slotted scheduling by the network controller 200 informing the access points 300a:300K about the determined time-slotted scheduling. It is assumed that the access point 300a is configured with the time-slotted scheduling. Particularly, the access point 300a is configured to perform step S202.

S202: The access point 300a obtains information about determined time-slotted scheduling from the network controller 200 of the industrial wireless network 110. According to the information, each timeslot is allocated to a respective one of the nodes 120a: 120N. Each timeslot for each node is divided in K sub-slots 550a:550K, one of which being for the access point 300a, such that in one single of the sub-slot of each timeslot, transmission or reception of a packet is made between the access point 300a and the node to which that timeslot is allocated.

The access point 300a the uses the time-slotted scheduling when communicating with the nodes 120a:120N. Particularly, the access point 300a is configured to perform step S204.

S204: The access point 300a communicates packets with the nodes 120a:120N according to the determined time-slotted scheduling.

Embodiments relating to further details of time-slotted scheduling of packets in timeslots between nodes 120a:120N and an access point 300a in an industrial wireless network 110 as performed by the access point 300a will now be disclosed.

As the skilled person understands, the embodiments, aspects, and examples as disclosed above relating to the time-slotted scheduling as performed by the network controller 200 also apply to the access point 300a.

For example, in terms of communicating packets with the nodes 120a:120N, the access point in one timeslot, within a set of guaranteed timeslots 520 of a superframe 500, communicates with one of the nodes 120a:120N and in a neighboring timeslot, within the same set of guaranteed timeslots 520 of the superframe 500, communicates with another one of the nodes 120a:120N, possibly where the timeslots are frequency offset relative each other.

Figure 6:
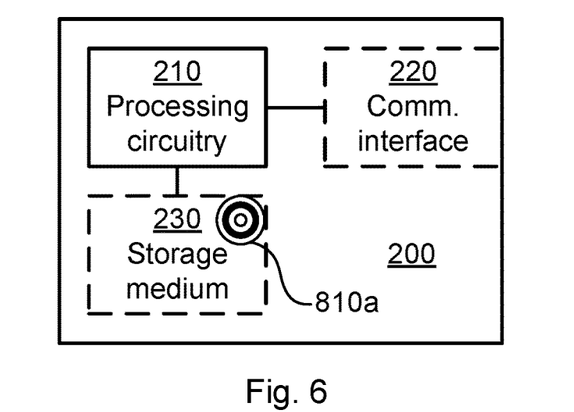
FIG. 6 is a schematic diagram showing functional units of a network controller 200 according to an embodiment.

FIG. 6 schematically illustrates, in terms of a number of functional units, the components of a network controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810a (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the network controller 200 to perform a set of operations, or steps, as disclosed above. For example, the storage medium 230 may store the set of operations, and the processing circuitry 210 may be configured to retrieve the set of operations from the storage medium 230 to cause the network controller 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network controller 200 may further comprise a communications interface 220 for communications with other entities, functions, nodes, and devices of the industrial communication network 100, such as the access points 300a:300K and the nodes 120a:120N via the access points 300a:300K. As such the communications interface 220 may comprise one or more transmitters and receivers, comprising analogue and digital components.

The processing circuitry 210 controls the general operation of the network controller 200 e.g. by sending data and control signals to the communications interface 220 and the storage medium 230, by receiving data and reports from the communications interface 220, and by retrieving data and instructions from the storage medium 230. Other components, as well as the related functionality, of the network controller 200 are omitted in order not to obscure the concepts presented herein.

Figure 7:
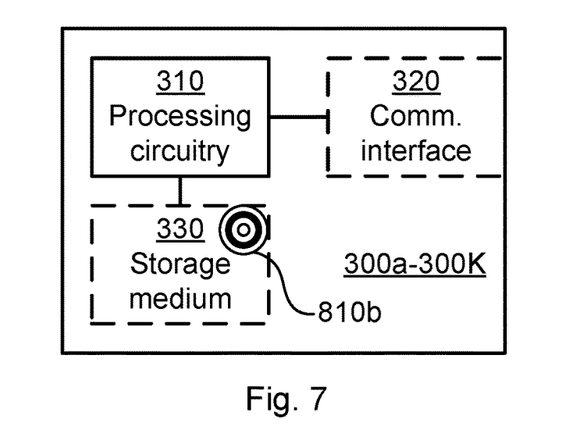
FIG. 7 is a schematic diagram showing functional units of an access point 300a according to an embodiment.

FIG. 7 schematically illustrates, in terms of a number of functional units, the components of an access point 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 810b (as in FIG. 8), e.g. in the form of a storage medium 330. The processing circuitry 310 may further be provided as at least one application specific integrated circuit (ASIC), or field programmable gate array (FPGA).

Particularly, the processing circuitry 310 is configured to cause the access point 300a to perform a set of operations, or steps, as disclosed above. For example, the storage medium 330 may store the set of operations, and the processing circuitry 310 may be configured to retrieve the set of operations from the storage medium 330 to cause the access point 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The access point 300a may further comprise a communications interface 320 for communications with other entities, functions, nodes, and devices of the industrial communication network 100, such as the network controller 200 and the nodes 120a:120N. As such the communications interface 320 may comprise one or more transmitters and receivers, comprising analogue and digital components.

The processing circuitry 310 controls the general operation of the access point 300a e.g. by sending data and control signals to the communications interface 320 and the storage medium 330, by receiving data and reports from the communications interface 320, and by retrieving data and instructions from the storage medium 330. Other components, as well as the related functionality, of the access point 300a are omitted in order not to obscure the concepts presented herein.

Figure 8:
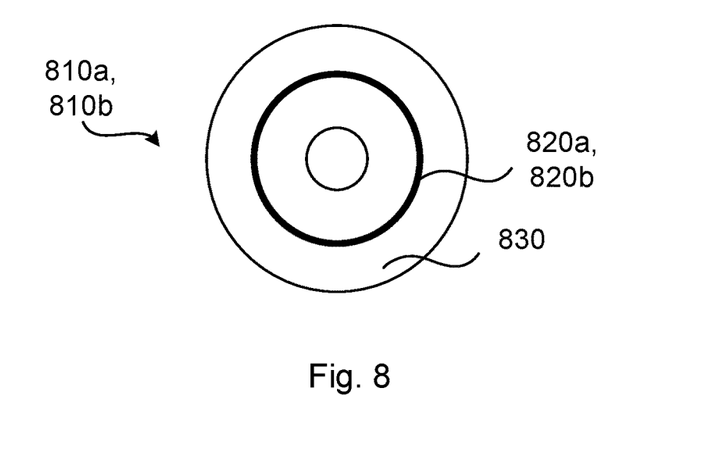
FIG. 8 shows one example of a computer program product comprising computer readable means according to an embodiment.

FIG. 8 shows one example of a computer program product 810a, 810b comprising computer readable means 830. On this computer readable means 830, a computer program 820a can be stored, which computer program 820a can cause the processing circuitry 210 and thereto operatively coupled entities and devices, such as the communications interface 220 and the storage medium 230, to execute methods according to embodiments described herein. The computer program 820a and/or computer program product 810a may thus provide means for performing any steps of the network controller 200 as herein disclosed. On this computer readable means 830, a computer program 820b can be stored, which computer program 820b can cause the processing circuitry 310 and thereto operatively coupled entities and devices, such as the communications interface 320 and the storage medium 330, to execute methods according to embodiments described herein. The computer program 820b and/or computer program product 810b may thus provide means for performing any steps of the access point 300a as herein disclosed.

In the example of FIG. 8, the computer program product 810a, 810b is illustrated as an optical disc, such as a CD (compact disc) or a DVD (digital versatile disc) or a Blu-Ray disc. The computer program product 810a, 810b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820a, 820b is here schematically shown as a track on the depicted optical disk, the computer program 820a, 820b can be stored in any way which is suitable for the computer program product 810a, 810b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for time-slotted scheduling of packets in timeslots between N nodes and K access points in an industrial wireless network, where N and K are real numbers and K>1, the method being performed by a network controller of the industrial wireless network, the method comprising:
determining the time-slotted scheduling by allocating each timeslot to a respective one of the nodes, wherein each timeslot for each node is divided in K sub-slots, one for each access point, such that in sub-slot k of each timeslot, where 1≤k≤K, transmission or reception of a packet is made between access point k and the node to which that timeslot is allocated; and
providing information to the access points about the determined time-slotted scheduling.

2. The method according to claim 1, wherein the timeslots are allocated such that adjacent timeslot are allocated to respective different ones of the nodes.

3. The method according to claim 1, wherein the access points are configured to serve a common set of the nodes.

4. The method according to claim 1, wherein respective duplicated messages are communicated within each timeslot such that in timeslot n, one and the same message is communicated between all the K access points and node n.

5. The method according to claim 1, wherein the sub-slots within each timeslot are frequency offset relative each other such that each of the K access points communicates with the nodes in its own frequency channel during each of the timeslots.

6. The method according to claim 1, wherein the timeslots are grouped into sets of guaranteed timeslots and each node is allocated a plurality of timeslots within each set of guaranteed timeslots, the plurality of timeslots including one timeslot for reception of a packet from the K access points and one timeslot for transmission of a packet to the K access points.

7. The method according to claim 1, wherein each set of guaranteed timeslots is part of a superframe.

8. The method according to claim 1, wherein the time-slotted scheduling is performed at medium access control (MAC) protocol layer.

9. A method for time-slotted scheduling of packets in timeslots between nodes and an access point in an industrial wireless network, the method being performed by the access point, the method comprising:
obtaining information about determined time-slotted scheduling from a network controller of the industrial wireless network, wherein according to the information, each timeslot is allocated to a respective one of the nodes, wherein each timeslot for each node is divided in K sub-slots, one of which being for the access point, such that in one of the sub-slots of each timeslot, transmission or reception of a packet is made between the access point and the node to which that timeslot is allocated; and
communicating packets with the nodes according to the determined time-slotted scheduling.

10. The method according to claim 1, wherein the nodes are sensors, actuators, and/or relays.

11. A network controller for time-slotted scheduling of packets in timeslots between N nodes and K access points in an industrial wireless network, where N and K are real numbers and K>1, the network controller comprising processing circuitry, the processing circuitry being configured to cause the network controller to:
determine the time-slotted scheduling by allocating each timeslot to a respective one of the nodes, wherein each timeslot for each node is divided in K sub-slots, one for each access point, such that in sub-slot k of each timeslot, where 1≤k≤K, transmission or reception of a packet is made between access point k and the node to which that timeslot is allocated; and
provide information to the access points about the determined time-slotted scheduling; and
communicate packets with the nodes according to the determined time-slotted scheduling.

12. The network controller according to claim 11, wherein the timeslots are allocated such that adjacent timeslot are allocated to respective different ones of the nodes.

13. The network controller according to claim 11, wherein respective duplicated messages are communicated within each timeslot such that in timeslot n, one and the same message is communicated between all the K access points and node n.

14. The network controller according to claim 11, wherein the sub-slots within each timeslot are frequency offset relative each other such that each of the K access points communicates with the nodes in its own frequency channel during each of the timeslots.

15. The network controller according to claim 11, wherein the timeslots are grouped into sets of guaranteed timeslots and each node is allocated a plurality of timeslots within each set of guaranteed timeslots, the plurality of timeslots including one timeslot for reception of a packet from the K access points and one timeslot for transmission of a packet to the K access points.

16. The network controller according to claim 11, wherein each set of guaranteed timeslots is part of a superframe.

17. An access point for time-slotted scheduling of packets in timeslots between nodes and an access point in an industrial wireless network, the access point comprising processing circuitry, the processing circuitry being configured to cause the access point to:
obtain information about determined time-slotted scheduling from a network controller of the industrial wireless network, wherein according to the information, each timeslot is allocated to a respective one of the nodes, wherein each timeslot for each node is divided in K sub-slots, one of which being for the access point, such that in one of the sub-slots of each timeslot, transmission or reception of a packet is made between the access point and the node to which that timeslot is allocated; and communicate packets with the nodes according to the determined time-slotted scheduling.

18. A network controller comprising:

processing circuitry; and a non-transitory storage medium storing a computer program for time-slotted scheduling of packets in timeslots between N nodes and K1 access points in an industrial wireless network, where N and K are real numbers and K>1, the computer program comprising computer code which, when run on the processing circuitry, causes the network controller to:

determine the time-slotted scheduling by allocating each timeslot to a respective one of the nodes, wherein each timeslot for each node is divided in K sub-slots, one for each access point, such that in sub-slot k of each timeslot, where $1 \leq k \leq K$, transmission or reception of a packet is made between access point k and the node to which that timeslot is allocated; and provide information to the access points about the determined time-slotted scheduling.

19. An access point comprising:

processing circuitry; and a non-transitory storage medium storing a computed program for time-slotted scheduling of packets in timeslots between nodes and the access point in an industrial wireless network, the computer program comprising computer code which, when run on the processing circuitry, causes the access point to:

obtain information about determined time-slotted scheduling from a network controller of the industrial wireless network, wherein according to the information, each timeslot is allocated to a respective one of the nodes, wherein each timeslot for each node is divided in K sub-slots, one of which being for the access point, such that in one of the sub-slots of each timeslot, transmission or reception of a packet is made between the access point and the node to which that timeslot is allocated; and communicate packets with the nodes according to the determined time-slotted scheduling.

20. A computer program product comprising a non-transitory computer readable storage medium and a computer program stored on the computer readable storage medium, the computer program comprising computer code which, when run on processing circuitry of an access point, causes the access point to:

obtain information about determined time-slotted scheduling from a network controller of an industrial wireless network, wherein according to the information, each timeslot if allocated to a respective one of a plurality of nodes, wherein each timeslot for each node is divided in K sub-slots, one of which being for the access point, such that in one of the sub-slots of each timeslot, transmission or reception of a packet is made between the access point and the node to which that timeslot is allocated; and communicate packets with the nodes according to the determined time-slotted scheduling.

* * * * *